(12) United States Patent
Stanek et al.

(10) Patent No.: US 7,057,010 B2
(45) Date of Patent: Jun. 6, 2006

(54) PROCESS FOR THE CONTINUOUS DRYING OF POLYMERS CONTAINING N OR AMINO, AMMONIUM OR SPIROBICYCLIC AMMONIUM GROUPS

(75) Inventors: Michael Stanek, Linz (AT); Georg Häubl, Linz (AT); Walter Raml, Hellmonsödt (AT); Erich Steinwender, Linz (AT)

(73) Assignee: DSM Fine Chemcials NFG GmbH & Co KG, Linz (AT)

( * ) Notice: Subject to any disclaimer, the term of this patent is extended or adjusted under 35 U.S.C. 154(b) by 0 days.

(21) Appl. No.: 10/757,514

(22) Filed: Jan. 15, 2004

(65) Prior Publication Data

US 2004/0143988 A1 Jul. 29, 2004

(30) Foreign Application Priority Data

Jan. 15, 2003 (AT) ................................. A 42/2003

(51) Int. Cl.
*C08F 6/00* (2006.01)

(52) U.S. Cl. .................. 528/480; 34/359; 502/104; 502/105; 502/208; 502/235; 502/242; 502/256; 526/98; 526/235; 526/236

(58) Field of Classification Search ................ 34/359; 502/104, 105, 208, 235, 242, 256; 526/98, 526/235, 236; 528/480
See application file for complete search history.

(56) References Cited

U.S. PATENT DOCUMENTS

| | | | | |
|---|---|---|---|---|
| 4,423,016 A | * | 12/1983 | Wirsching et al. | 423/170 |
| 4,519,961 A | | 5/1985 | Schumacher et al. | |
| 4,730,035 A | * | 3/1988 | Mark et al. | 528/483 |
| 5,703,203 A | * | 12/1997 | Fezza et al. | 528/483 |
| 5,917,081 A | | 6/1999 | Seyffert et al. | |
| 5,955,036 A | | 9/1999 | Seyffert et al. | |
| 6,600,011 B1 | * | 7/2003 | McDonnell et al. | 528/480 |

FOREIGN PATENT DOCUMENTS

| | | |
|---|---|---|
| AT | 409629 | 9/2002 |
| AT | 409630 | 9/2002 |

* cited by examiner

*Primary Examiner*—Terressa Boykin
(74) *Attorney, Agent, or Firm*—Wenderoth, Lind & Ponack, L.L.P.

(57) ABSTRACT

Process for the drying of polymers containing N or amino, ammonium or spirobicyclic ammonium groups, comprising cationic N-containing groups, and suitable counterions, in which the gelled and washed polymers obtained by polymerization, crosslinkage and optionally alkylation are dried continuously using a gaseous medium under normal pressure or overpressure in a fluidized bed.

9 Claims, No Drawings

PROCESS FOR THE CONTINUOUS DRYING OF POLYMERS CONTAINING N OR AMINO, AMMONIUM OR SPIROBICYCLIC AMMONIUM GROUPS

The invention relates to a process for the continuous drying of polymers containing N or amino, ammonium or spirobicyclic ammonium groups, which, for example, are employed in medicine for lowering the cholesterol level by binding of bile acids or of bile acid salts.

Polymers containing N or amino, ammonium or spirobicyclic ammonium groups are polymers having cationic groups and suitable counterions, which can optionally contain hydrophobic groups. The cationic groups are derived here, for example, from amines or ammonium groups.

Hydrophobic groups are, for example, side chains containing N or amine or ammonium groups or alkyl side chains which are covalently linked with the polymer network by chemical reaction.

Suitable polymers have already been disclosed in the prior art, for example in WO 01/25291, WO 00/32656, WO 00/38664, WO 99/33452, WO 99/22721, WO 98/43653, WO 02/48209, WO 02/22695, U.S. Pat. No. 5,624,963, U.S. Pat. No. 5,496,545 etc.

These polymers are prepared analogously to the prior art, for example by polymerization of the corresponding monomers, the crosslinking being carried out either by addition of the crosslinker to the reaction mixture during the polymerization or following the polymerization reaction. After the appropriate gelling time, the gels obtained are optionally chopped or comminuted and washed. A polymer-analogous reaction is then optionally carried out, such as, for example, an alkylation of the polymers obtained in gel form, which then, in turn, are washed in a number of steps and finally dried.

According to the prior art, the drying of the moist gels which have bound up to approximately 90% of water is carried out, for example, by contact drying. In this variant, the energy necessary for the evaporation of water is transferred by the direct contact of product with the heating surface. For; the drying rate, the temperature difference between heating surface temperature and product temperature is decisive here.

During the drying, the volume of the polymer gel greatly decreases. This has an adverse effect on the product/heating surface heat transfer, since, depending on the construction of the dryer, the entire heating surface is no longer available for the energy transfer. In order to utilize the existing heating surface to a great extent, moist gel can be added during the drying and the volume of the material to be dried can thus be kept constant. This requires, however, a longer residence time in the dryer. Longer residence times in turn have an adverse effect on the product quality. The daily throughput in contact dryers is moreover relatively low.

A further disadvantage of contact dryers is that product incrustation on the heating surface occurs, as a result of which the product quality is also adversely affected by higher temperature stress. In addition, the heat transfer worsens with increasing incrustation, as a result of which the drying efficiency falls.

A further drying variant for polymer gels known from the prior art is drying in a circulating air oven. In this variant too, the heat transfer is inadequate. Moreover, circulating air ovens (drying chambers) are only suitable for the laboratory scale and not for use on the industrial scale.

The presence of oxygen also has a disadvantageous effect on the product quality in drying processes used hitherto, since discoloration of the gel and an increase in impurities, such as, for example, decylamine or didecylamine, readily occurs.

The object of the invention was accordingly to find a suitable drying process for polymers containing N or amine, ammonium or spirobicyclic ammonium groups, which in a simple manner guarantees a high product quality with, at the same time, increased daily throughput.

Unexpectedly, it was possible to achieve this object by continuous drying in a fluidized bed.

The invention accordingly relates to a process for the drying of polymers containing N or amine, ammonium or spirobicyclic ammonium groups, comprising cationic N-containing groups, and suitable counterions, which comprises continuously drying the gelled and washed polymers obtained by polymerization, crosslinkage and optionally alkylation using a gaseous medium under normal pressure or elevated pressure in a fluidized bed.

In the process according to the invention, polymers containing N or amine, ammonium or spirobicyclic ammonium groups are dried.

These polymers are polymers which are described, for example, in WO 01/25291, WO 00/32656, WO 00/38664, WO 99/33452, WO 99/22721, WO 98/43653, WO 02/48209, WO 02/22695, U.S. Pat. No. 5,624,963 and U.S. Pat. No. 5,496,545 or in Polymer Preprints 2000, 41(1), 753.

Cationic polymers, in particular, are suitable for the drying process according to the invention. The cationic polymers include, inter alia, those polymers which contain an amine N atom, such as, for example, primary, secondary or tertiary amine groups or salts thereof, quaternary ammonium groups and/or spirobicyclic ammonium groups. Additional cationic groups comprise amidino, guanidino, imino etc.

The cationic polymer is distinguished in that it has a positive charge at physiological pH.

Examples of suitable cationic polymers comprise polyvinylamines, polyallylamines, polydiallylamines, polyvinylimidazoles, polydiallylalkylamines, polyethyleneimines, etc, and polymers comprising the repeating units known from, for example, WO 00/32656, page 7f., WO 98/43653, page 4f., U.S. Pat. No. 5,496,545, column 2 to 4; U.S. Pat. No. 5,624,963; WO 98/29107 etc.

The cationic polymer can optionally additionally be combined with a hydrophobic polymer or a hydrophobic component, such as described, for example, in WO 98/43653, WO 99/33452 or WO 99/22721 etc.

The polymers employed are moreover crosslinked. The crosslinking can be carried out here as early as during the polymerization or else alternatively only following the polymerization. Suitable crosslinking agents comprise the crosslinking agents known from the references already cited. Examples of these are epichlorohydrin, succinyl dichloride, ethylenediamine, toluene diisocyanate, diacrylates, dimethacrylates, methylenebisacrylamides, dichloroethane, dichloropropane, etc.

The polymers employed for the process according to the invention in addition have negatively charged counterions. These counterions can be organic or inorganic ions or combinations thereof. Suitable counterions likewise comprise the counterions known from the prior art already cited. Examples of suitable inorganic ions are halides, in particular chloride, phosphates, phosphites, carbonates, bicarbonates, sulfates, bisulfates, hydroxides, nitrates, persulfates, sulfites and sulfides. Examples of suitable organic ions are acetates, ascorbates, benzoates, lactate, fumarate, maleate, pyruvate, citrates, dihydrogencitrates, hydrogencitrates, propionate, butyrate, oxalates, succinates, tartrates, cholates etc.

Following the polymerization, crosslinkage and gelling time, the corresponding polymer gels are optionally chopped or comminuted, optionally alkylated and finally washed.

The polymers are prepared according to the prior art, for example as described in WO 99/33452, WO 99/22721, WO 98/43653, WO 02/48209, WO 02/22695, U.S. Pat. No. 5,624,963 and U.S. Pat. No. 5,496,545 or in Polymer Preprints 2000, 41(1), 753.

The moist polymers obtained in gel form according to the prior art are then dried according to the invention.

In the drying according to the invention, a gaseous medium, such as, for example, gaseous nitrogen, air or a mixture thereof, is heated to 40° C.–250° C., preferably from 1000 to 160° C. and injected into the fluidized bed dryer from below via a sieve bottom, preferably a Conidur bottom (perforated bottom) with directed flow in the dryer outlet direction. The motion of the product in the fluidized bed in the dryer outlet direction can, however, also be carried out mechanically, for example by means of a shaker bottom.

Depending on the particle size and the specific weight of the polymer gel to be dried, at a certain gas velocity the loosening of the moist product, formation of a fluidized bed and, on further increase in the gas rate, product discharge, occurs. Between these two points, i.e. between loosening and discharge, the fluidized bed is operated, the gas velocity being adjusted depending on the particle diameter. The heavier and larger the particles or the particle diameter, the higher the gas velocity should be.

For polymer gels having a particle diameter of the moist gel particles (moistness 85%) of, for example, 0.1 mm to 6 mm, the gas velocity preferred for loosening (temperature of the gas 80° C.) is, according to the invention, between 0.02 m/sec and 3.5 m/sec and the discharge rate according to the invention is between 0.29 m/sec and 13.5 m/sec.

Preferably, in the drying according to the invention, a gas velocity of 1–3 m/sec, particularly preferably of 1.5–2.5 m/sec, is set.

A largely constant fluidized bed is then formed in the fluidized bed, the height of the fluidized bed can be varied here by means of the amount of product introduced, as a result of which the residence time in the fluidized bed dryer is influenced. The more gel to be dried is introduced, the higher the fluidized bed and the longer the residence time of the gel in the dryer.

The fluidized bed can, however, also be operated using various temperature zones having different gas velocities. Thus, it is possible, for example, to set higher temperatures and higher gas velocities at the dryer entrance and lower temperatures and lower gas velocities in the region of the dryer outlet.

The product supply, i.e. the supply of the polymer gel to be dried, which can have up to approximately 90% of bound water, and the product removal, i.e. the removal of the dried polymer gel, is carried out continuously according to the invention, the weight reduction having to be taken into consideration during product removal so that a constant amount of fluidized bed is situated in the dryer. Thus, for example, with a gel containing 85% moisture approximately one-seventh of the amount introduced can be removed.

The introduction can be carried out here, for example, by means of a double pendulum flap, a nibbler or a static sieve having a rotor.

At the start of the fluidized bed, it is also possible to introduce already dried material as a base layer.

The fluidized bed drying according to the invention is carried out at normal pressure or at slight over-pressure.

As a result of the good heat transfer, water is evaporated from the moist gel particles, as a result of which the gas cools and a temperature drop of 20–40° C. forms from the product introduction (moist gel) to the product discharge (dry gel).

At the dryer exit, the polymer gel heats to 60 to 120° C., preferably to 80 to 100° C.

The dried polymer gel then has a very constant water content of approximately 2 to 5%.

The moist waste gas, with the fine fraction optionally discharged from the fluidized bed, is led for the separation of the fine fraction through a filter installed in the dryer. The separation, however, can also be carried out by means of a cyclone separator having a fine filter connected in series. The fine fraction can optionally be fed back into the dryer again.

The moist waste gas, which has a temperature from approximately 70 to 100° C., is then led through a condenser and cooled to 5 to 35° C., preferably to 10 to 30° C. The gas is then heated again to 40° C.–250° C. with 100% saturation, preferably to 1000 to 160° C., and again led into the fluidized bed dryer.

The residence time of the polymers in the dryer is dependent on the product weight in the fluidized bed and in the process according to the invention is between 5 and 12 hours.

By means of the process according to the invention, polymers containing N or amino, ammonium or spirobicyclic ammonium groups can be dried with a significantly lower residence time and temperature stress in comparison with the prior art, with a markedly increased daily throughput, at the same time a high product quality, i.e. no byproduct formation and no discoloration, being guaranteed.

The process according to the invention is in particular suitable for the drying of polymers which are crosslinked and contain cationic N-containing or amine, ammonium or spirobicyclic ammonium groups, and suitable counterions. Preferably, the process is employed, however, for the drying of crosslinked and alkylated polyallylamines and polydiallylamines having N-containing or amine, ammonium or spirobicyclic ammonium groups.

EXAMPLE 1

The dependence of the gas velocity at loosening of the moist gel and the discharge rate on the particle size of the moist gel particles were determined.

For this, hot $N_2$ gas at 80° C. was introduced via a Conidur bottom into a fluidized bed dryer in which a heat transfer number of approximately 200–350 W/° $Km^2$ is achieved. The gel to be dried used was colesevelam hydrochloride, prepared analogously to Polymer Preprints 2000, 41(1), 753. ($\rho$=1050 kg/$m^3$)

The volume contraction of moist colesevelam HCl to dry colesevelam HCl was calculated with a moistness of 85%.

| D moist mm (diameter) | V loosening m/sec | V discharge m/sec | d dry mm (diameter) | V loosening m/sec | V discharge m/sec |
|---|---|---|---|---|---|
| 0.119 | 0.042 | 0.291 | 0.063 | 0.012 | 0.096 |
| 0.236 | 0.156 | 0.824 | 0.125 | 0.046 | 0.316 |
| 0.471 | 0.480 | 1.926 | 0.250 | 0.17 | 0.89 |

-continued

| D moist mm (diameter) | V loosening m/sec | V discharge m/sec | d dry mm (diameter) | V loosening m/sec | V discharge m/sec |
|---|---|---|---|---|---|
| 0.94 | 1.016 | 3.77 | 0.5 | 0.52 | 2.05 |
| 1.88 | 1.68 | 6.53 | 1 | 1.07 | 3.98 |
| 3.77 | 2.52 | 10.46 | 2 | 1.74 | 6.83 |
| 5.64 | 3.12 | 13.41 | 3 | 2.22 | 9.02 |

EXAMPLE 2

300 kg/h of moist colesevelam hydrochloride, prepared analogously to Polymer Preprints 2000, 41(1), 753, having a max. grain size of 4 mm and 85% water content was introduced continuously into a fluidized bed dryer. $N_2$ gas was heated to 130° C. and injected into the dryer from below at normal pressure at a velocity of 1.5–2.5 m/sec. In the fluidized bed, a largely constant fluidized bed having a constant amount of fluidized bed of 300 to 400 kg/m² of Conidur bottom area (Conidur bottom area 2.5 m²) formed. The temperature fall from product introduction to product discharge was 30° C. 45 kg/h of dry colesevelam HCl were removed.

The temperature of the dry colesevelam HCl was 85–90° C. and the water content 2–5%.

The residence time was 6.6 h to 8.8 h.

The moist waste gas having a temperature of 80–85° C. and a water content of 40–60 g/m³ was led through a condenser and cooled to 25° C. The water content after the condenser was 17–30 g/m³. The gas was then heated again with 100% saturation and injected into the dryer again.

Daily throughput: 1080 kg

COMPARISON EXAMPLE

Drying of moist colesevelam HCl in two 4 m³ conical dryers.

In a first conical dryer, the drying of about 10,000 kg of moist colesevelam (volume of about 15 m³) was carried out until the volume was at most 4 m³.

The heating temperature was adjusted to 120–130° C. and the drying was carried out under a vacuum of 30–50 mbar. The product temperature here increased to about 45° C.

The drying time was 85 hours.

Firstly, approximately 2000 kg of moist product were introduced into the dryer. The further addition of the remaining 8000 kg of moist product was then carried out in the course of 70–80 hours.

After the volume had decreased to <4 m³, the drying in the first dryer was ended and the product was transferred to the second dryer.

Drying without addition of moist product was carried out there down to a water content of about 4%.

The heating mantle temperature at the beginning was 120–130° C. and was lowered to about 70° C. toward the end of the drying in order to avoid overheating of colesevelam HCl. The vacuum during the drying was 50–100 mbar and was dependent on the filter cleaning during the drying.

Drying time 80–90 hours. A drying efficiency of about 400 kg of dry colesevelam HCl/daily thus resulted.

The invention claimed is:

1. A continuous process for the drying of polymers containing N or amino, ammonium or spirobicyclic ammonium groups, comprising cationic N-containing groups, and suitable counterions, which comprises continuously drying gelled and washed, moist polymers obtained by polymerization, crosslinkage and optionally alkylation, by injecting a gaseous medium under normal pressure or overpressure into a fluidized bed dryer, whereby polymer gel, which can have up to approximately 90% of bound water, is introduced continuously into the fluidized bed dryer, whereupon owing to the gaseous medium injected into said fluidized bed, moist polymer gel is loosened, then the formation of a constant fluidized bed occurs and finally sufficient dried polymer gel, which has a water content of 2 to 5%, is removed continuously from the fluidized bed dryer such that a constant amount of fluidized bed remains in the dryer.

2. The process as claimed in claim 1, wherein the gaseous medium is heated to 40 to 250° C. and injected into a fluidized bed dryer through a sieve bottom having a directed flow in the dryer outlet direction.

3. The process as claimed in claim 2, wherein the bed gaseous medium is injected into the fluidized bed dryer with a velocity of 0.02 m/sec to 3.5 m/sec.

4. The process as claimed in claim 2, wherein after a residence time of 5 to 12 h, sufficient dried polymer gel, which has a water content of 2 to 5%, is removed continuously from the fluidized bed dryer such that a constant amount of fluidized bed remains in the dryer.

5. The process as claimed in claim 4, wherein the polymer gel is heated to 60 to 120° C. at the dryer exit.

6. The process as claimed in claim 4, wherein the moist nitrogen waste gas, which has a temperature from 70 to 100° C., is led with any polymer gel fines discharged from the fluidized bed, for the separation of the fine fraction through a filter situated in the dryer or through a cyclone separator having a fine filter connected in series, then led through a condenser, cooled to 5 to 35° C. and then heated again to 40 to 250° C. with 100% saturation and again led into the fluidized bed dryer.

7. The process as claimed in claim 4, wherein various temperature zones having different gas velocities are established in the dryer.

8. The process as claimed in claim 4, wherein the introduction of the product is carried out via a double pendulum flap, via a nibbler or a static sieve with a rotor.

9. The process as claimed in claim 4, wherein dried product is introduced into the dryer as a base layer.

* * * * *